June 6, 1939.   C. L. EKSERGIAN   2,161,740
WHEEL MOUNTING
Filed May 11, 1936

INVENTOR.
CAROLUS L. EKSERGIAN.
BY
ATTORNEY.

UNITED STATES PATENT OFFICE 2,161,740

WHEEL MOUNTING

Carolus L. Eksergian, Detroit, Mich., assignor to Budd Wheel Company, Philadelphia, Pa., a corporation of Pennsylvania Application May 11, 1936, Serial No. 79,103

4 Claims. (Cl. 301—9)

This invention relates to a mounting stud assembly for motor vehicle wheels and particularly dual wheels for heavy duty vehicles of that type wherein the wheel discs are bolted to the radially projecting mounting flange of the hub member and ride free of the hub, the entire load taken by the wheels being imposed directly on the studs and nuts which are used to clamp the wheel discs to the hub flange. It is obvious that in this type of mounting assembly, the torque and radial and lateral load stresses imposed on the studs and nuts therefor are severe, causing the studs in some instances to fracture or break, and tending to loosen the nuts.

It is an object of the present invention to provide an improved mounting stud assembly which will embody a certain amount of spring or give between the wheel and stud, to thereby in effect cushion the shocks incident to load stresses; and to also provide an improved type of nut for the stud which will give greater security against loosening or unscrewing than those of known prior stud assemblies.

The invention also contemplates a wheel mounting construction which will facilitate the mounting and demounting operations of the dual wheels and also effect a more secure locking of the latter to the hub flange. To this end, the construction is such that the inner wheel disc is centered radially during the mounting operation by the stud itself while the outer disc is centered and held in centered position by the nut and at the same time the inner disc is clamped against the hub flange and the outer disc is clamped against the inner disc, the latter then being held against movement or displacement during service principally by frictional contact with the outer disc and the hub flange. Since the hub openings of the discs are of such diameter as to ride free of the hub barrel, the wheel discs are located radially at only one point, namely, the bolt circle portion. There are certain advantages to this arrangement which will be rendered apparent in view of the following description taken in conjunction with the drawing, wherein:

Figure 1:
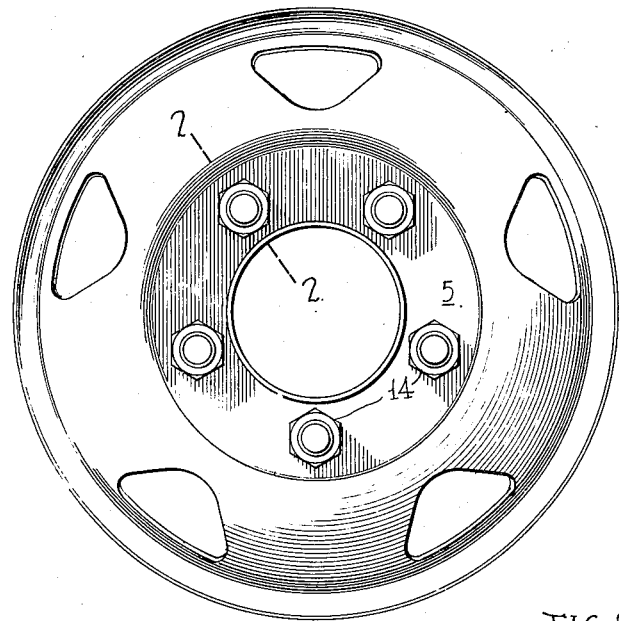
Figure 1 is a view in outboard side elevation of a heavy duty or truck wheel of the dual type mounted in accordance with the present invention.
Figure 2:
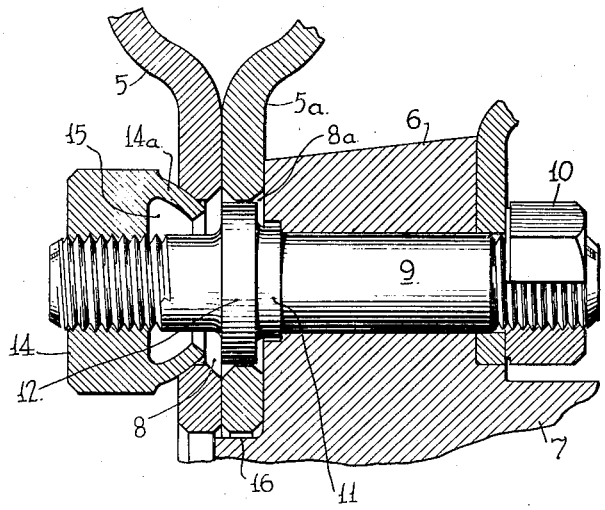
Figure 2 is a sectional view taken substantially on the line 2—2, Fig. 1.

Referring to the drawing in detail, a pair of dual wheel discs are indicated at 5 and 5a and are mounted on the flange 6 of the hub barrel 7.

The wheel discs 5 and 5a are formed with a series of bolt circle openings or holes 8 and 8a, a plurality of studs 9 extending through the hub flange 6. These studs are each fixed to the flange by means of a nut 10 on the inner side of the flange and a shoulder 11 adapted to seat in a recess formed in the outboard side of the hub flange.

The studs 9 each have formed thereon an annular locating or centering boss 12 adapted to be engaged by the annular conical seat portion of the corresponding or mating bolt opening of the wheel disc when the latter is mounted on the hub flange.

A feature of the present invention lies in the provision of a particular type of cap nut 14 for the studs 9, said nut being formed with a substantially spherical or ball seat 14a which projects from the body of the nut in the form of a skirt, the nut being undercut or chambered as at 15, thereby leaving the walls of the skirt free to have a limited amount of spring or give when the nut is screwed home in the outer wheel disc.

Due to the fact that the ball seat or skirt 14a embodies a limited amount of spring or give, the radial and lateral load stresses imposed on the nut will be softened or relieved so that the shocks taken by the stud 9 will also be relieved. Furthermore, the improved type of seat or skirt has more tendency to bind in its seat than a solid nut, and it assists in maintaining each nut under tension at all times regardless of slight deviation of plane of the wheel faces, or independently of relative slight differences in tension of the remaining nuts, so that any tendency towards loosening and unscrewing will be minimized.

It will be noted that the bolt hole 8a for the inner wheel disc has a certain amount of tolerance or clearance around the centering or locating boss 12, and it will also be noted that there is clearance between the hub opening or inner diameter of the disc and the hub barrel 7 as at 16. Thus at no time does the wheel disc ride on the hub barrel, nor does the hub barrel serve as a radial locating means in the mounting of the wheel.

When the wheel discs are clamped against the hub flange 6, the skirt or ball seat 14a centers the outer disc 5 radially, while the inner disc is centered radially by the shoulder or collar 12, and at the same time the inner face of the inner wheel disc 5a is tightened against the contiguous face of the flange 6 and adjusts itself to the planar surface of said flange and the same action takes place between the inner and outer discs.

In mounting the wheel discs, the inner wheel 5a is first positioned on the pilot collars or shoulders 12 of the studs, which serve to center the wheel radially. The outer disc 5 is then positioned on the ends of the studs and the nuts 14 are applied and tightened down, whereupon the outer disc is accurately centered radially and at the same time is clamped tightly against the inner disc. Thus the inner disc is held in position principally by frictional contact with the outer disc, so that the actual bearing of the inner disc on the collars or shoulders 12 may be regarded primarily as an initial locating means at the time of mounting the wheel, the radial load being transmitted to the outer wheel principally through frictional contact therewith. Accordingly, it is not necessary for the wheel discs to ride on the hub 7. Hence clearance may be had between the hub openings of the discs 5 and 5a and mounting of the wheel is expedited or facilitated, since radial location takes place only at one point.

Another important advantage is that irrespective of deviation of plane of the inner faces of the wheel discs, radial location is unhampered, since when the nuts are tightened down, the contiguous faces of the wheel discs and hub flange are drawn into contact and maximum bearing pressure is attained, the hub and bolt circle clearances permitting free and unhampered mounting.

The tolerance between the collar or shoulder 12 and bolt circle opening 8a is slight, and in fact this may be considered hardly more than a manufacturing tolerance. Experience has shown that very little bearing or wear takes place at this point, due to the fact that the inner disc is held in place primarily by frictional engagement with the outer disc and hub flange. Experience has also shown that when the wheel discs ride the hub barrel and the tolerance between the bolt circle openings and studs is too limited, there is a tendency of the wheel discs to stick and render removal difficult, an objectionable feature which is overcome by the present invention.

It will be understood that advantages other than those above stated may be inherent in the invention, and that certain changes and modifications in structure and design may be adopted within the scope of the invention as defined by the appended claims.

What I claim is:

1. In a vehicle wheel assembly comprising a hub having a radially-extending wheel-supporting flange, a wheel body provided with stud circle openings, a plurality of annularly arranged threaded studs secured to said flange and projecting axially outward therefrom, and threaded cap nuts having ball-shaped seating portions, that improvement which consists in forming each of said nuts with a chambered portion providing an inner surface similar to the surface of the ball-shaped seating portion leaving a thin wall portion of approximately uniform thickness, the axially inner portion being spaced from said stud, said nut and said stud contacting each other only at their engaging screw-threaded portions, said thin wall portion engaging said wheel body and centering the same and also permitting a limited amount of radial elastic deformation thereof.

2. A mounting stud assembly for vehicle wheels comprising a threaded stud and a threaded cap nut therefor, said nut being provided with a ball-shaped seating portion and being further provided with a chambered portion having an inner surface similar to the surface of the ball-shaped seating portion leaving a thin wall elastic portion of approximately uniform thickness, the wheel engaging portion of said nut being spaced from said stud, said nut and said stud contacting each other only at their engaging screw-threaded portions, said thin wall portion engaging said wheel and centering the same and also permitting a limited amount of radial elastic deformation thereof.

3. A mounting stud assembly for vehicle wheels comprising a threaded stud and a threaded cap nut therefor, said nut being provided with a ball-shaped seating portion and being further provided with a chambered portion having an inner surface similar to the surface of the ball-shaped seating portion leaving a spherical shell portion of approximately uniform thickness, the wheel engaging portion of said nut being spaced from said stud, said nut and said stud contacting each other only at their engaging screw-threaded portions, said spherical shell portion engaging said wheel and centering the same and also permitting a limited amount of radial elastic deformation thereof.

4. In a vehicle wheel assembly comprising a hub having a radially-extending wheel supporting flange, dual inner and outer wheel discs each having a hub opening of a diameter greater than said hub so that the discs at all times ride free of the latter, said discs being provided with a plurality of stud circle openings, a plurality of annularly arranged threaded studs secured to said flange and projecting axially outwardly therefrom, each of said studs being formed with an annular portion thereon adapted to engage in the mating stud circle opening of said inner disc and locate said disc radially during the mounting operation, and threaded cap nuts having ball-shaped seating portions for said nuts, that improvement which consists in forming each of said nuts with a chambered portion providing an inner surface similar to the surface of the ball-shaped seating portion leaving a thin spherical shell portion of approximately uniform thickness, the axially inner portion being spaced from said stud, said nut and said stud contacting each other only at their engaging screw-threaded portions, said spherical shell portion engaging said axially outer disc to locate the same radially and also permitting a limited amount of radial elastic deformation of said spherical shell portion.

CAROLUS L. EKSERGIAN.